US012735914B2

(12) United States Patent
Liang

(10) Patent No.: US 12,735,914 B2
(45) Date of Patent: Sep. 15, 2026

(54) FENCE KIT

(71) Applicant: Ruopeng Liang, Zhongshan City (CN)

(72) Inventor: Ruopeng Liang, Zhongshan City (CN)

( * ) Notice: Subject to any disclaimer, the term of this patent is extended or adjusted under 35 U.S.C. 154(b) by 257 days.

(21) Appl. No.: 18/418,582

(22) Filed: Jan. 22, 2024

(65) Prior Publication Data

US 2025/0163724 A1 May 22, 2025

(30) Foreign Application Priority Data

Nov. 17, 2023 (CN) ........................ 202323120387.8

(51) Int. Cl.
*E04H 17/18* (2006.01)
*E06B 11/02* (2006.01)
*A01K 3/00* (2006.01)

(52) U.S. Cl.
CPC ........... *E04H 17/18* (2013.01); *E04H 17/185* (2021.01); *E06B 11/022* (2013.01); *A01K 3/001* (2021.08)

(58) Field of Classification Search
CPC .......... A01K 1/02; A01K 1/034; E04H 17/18; E04H 17/185; E06B 11/022; Y10T 403/32926
See application file for complete search history.

(56) References Cited

U.S. PATENT DOCUMENTS 3,628,816 A * 12/1971 Ross, Jr. ............. F16B 19/1081 403/243
6,406,002 B1 * 6/2002 Hardy, III ............... E04H 17/18 256/64
8,210,127 B2 * 7/2012 Kaneda .................. A01K 1/034 119/501
9,212,680 B2 * 12/2015 Schneider ............ B64D 11/003
9,357,748 B2 * 6/2016 Cantwell ................ A01K 1/035
9,410,348 B1 * 8/2016 Flannery ................. E06B 11/02
9,587,660 B2 * 3/2017 Pomerantz ............. A01K 1/034
11,585,360 B2 * 2/2023 Zhu ......................... E04H 17/17
12,312,828 B2 * 5/2025 Wang .................... E04H 17/013

FOREIGN PATENT DOCUMENTS

CN 204419771 U 6/2015
JP 5160497 B2 * 3/2013 ............. A01K 31/02

* cited by examiner

*Primary Examiner* — Michael P Ferguson
(74) *Attorney, Agent, or Firm* — Oliff PLC

(57) ABSTRACT

The present invention discloses a fence kit, comprising at least two fence panels and a corner base assembly, two adjacent fence panels being rotatably connected to each other, and the corner base assembly being arranged between the two adjacent fence panels, wherein the corner base assembly includes a corner support, an upper surface of the corner support is provided with at least two mounting grooves, the mounting grooves are connected at one end and open at the other end, the mounting grooves match the shape of the bottom of the fence panels, and the two adjacent fence panels are respectively inserted into any two mounting grooves. The object of the present invention is to overcome the deficiencies of the prior art and provide a fence kit with a simple structure and better stability.

10 Claims, 7 Drawing Sheets

FENCE KIT

TECHNICAL FIELD

The invention particularly relates to a fence kit.

BACKGROUND ART

With the improvement of people's living standard, more and more people like to raise animals such as cats and dogs as pets. Generally, the living environment for pets is mainly indoors or pet cages, but for some pets, the living space is too narrow, some pets cannot live indoors for a long time, and pet cages are not easy to move, so the present inventors have developed a pet fence. For example, as disclosed in the patent with the patent number CN201520035253.2, which is entitled "Lock catch and pet fence using lock catch", the fence can be enclosed into a circle to form a space for the pet to move, or the fence and the wall together to form a space for the pet to move. The pet fence has a simple structure and high adaptability, which is easy to move, but the traditional pet fence has poor structural stability after assembly, which is easy to loose.

The present invention is based on the above-mentioned deficiencies.

SUMMARY OF THE INVENTION

The object of the present invention is to overcome the deficiencies of the prior art and provide a fence kit with a simple structure and better stability.

The present invention is achieved by the following technical solutions:

A fence kit, including at least two fence panels and a corner base assembly, two adjacent fence panels being rotatably connected to each other, and the corner base assembly being arranged between the two adjacent fence panels, wherein the corner base assembly includes a corner support, an upper surface of the corner support is provided with at least two mounting grooves, the mounting grooves are connected at one end and open at the other end, the mounting grooves match the shape of the bottom of the fence panels, and the two adjacent fence panels are respectively inserted into any two mounting grooves.

According to the above-mentioned fence kit, the corner base assembly further includes a reinforcing member connected to the corner support and configured to fix the corner support to the ground.

According to the above-mentioned fence kit, a middle portion of the corner support is provided with an insertion hole, and the reinforcing member includes an insertion rod capable of passing through the insertion hole from top to bottom and protruding downward from the bottom of the corner support, wherein the insertion rod is of a sharp shape with a large upper portion and a small lower portion, and the top of the insertion rod is provided with a snap joint capable of being snapped at a hole opening of the insertion hole.

According to the above-mentioned fence kit, the insertion hole is a circular hole, an edge of the insertion hole is provided with a notch, and the insertion rod is provided at a side adjacent to the snap joint with a first clamping protrusion capable of passing through the notch when the insertion rod passes through the insertion hole.

According to the above-mentioned fence kit, the insertion rod, the snap joint and the first clamping protrusion are an injection molded one-piece unitary structure.

According to the above-mentioned fence kit, the insertion rod is a metal piece, a bending piece of a metal material is connected to the top of the insertion rod by welding, wherein the bending piece has a first bending portion and a second bending portion protruding outwards, the first bending portion constitutes the snap joint, and the second bending portion constitutes the first clamping protrusion.

According to the above-mentioned fence kit, the middle portion of the corner support is provided with an insertion hole, an edge of the insertion hole is provided with a notch, the reinforcing member includes a suction cup, a top of the suction cup is provided with a plug post capable of passing through the insertion hole from bottom to top, and a top of the plug post is provided with a second clamping protrusion capable of passing through the notch when the plug post passes through the insertion hole.

According to the above-mentioned fence kit, the fence panel is provided with an upper mounting pipe on one side and a lower mounting pipe on the other side, the upper mounting pipe of one fence panel is centrally aligned with the lower mounting pipe of the adjacent other fence panel, and a rotary shaft rod capable of passing through the upper mounting pipe and the lower mounting pipe is provided between the two adjacent fence panels so as to enable a rotary connection between the two adjacent fence panels.

According to the above-mentioned fence kit, the upper mounting pipe and the lower mounting pipe are both internally provided with a sleeve member, a top of the sleeve member is provided with a positioning ring capable of being clamped at an upper end of the upper mounting pipe or the lower mounting pipe, a bottom of the sleeve member is provided with a snap capable of being clamped at a lower end of the upper mounting pipe or the lower mounting pipe, and the rotary shaft rod is inserted inside the sleeve member.

According to the above-mentioned fence kit, at least one fence panel is provided with a door and a door panel capable of rotating relative thereto to close the door, wherein the door panel is provided with two transverse locking rods, and the fence panel is provided with a door lock, the door lock includes a housing, the housing is provided with two locking blocks capable of sliding relative thereto, an elastic member being provided between the locking blocks and the housing capable of pushing the two locking blocks to move away from each other, the locking blocks are provided with handles protruding outwards for human operation, and the locking blocks are further provided with stop blocks capable of stopping the movement of the locking rods when the two locking blocks move away from each other.

Compared with the prior art, the present invention has the following advantages:

1. According to the present invention, the corner base assembly is arranged between the two adjacent fence panels, wherein the corner base assembly includes a corner support, an upper surface of the corner support is provided with at least two mounting grooves, the different mounting grooves are connected at one end and open at the other end, an included angle of 1° to 180° is provided between the different mounting grooves, the mounting grooves match the shape of the bottom of the fence panels, and after the two adjacent fence panels are respectively inserted into any two mounting grooves, an included angle of 1° to 180° is provided between the two fence panels. When there are three or more fence panels, fence circles of triangular, quadrilateral and pentagonal shapes may be enclosed, and the mounting grooves of the corner base assembly can fix and lock the two adjacent fence panels, so that the adjacent fence panels stably form an included angle, which are not easy to loosen, have better structural stability, are easy to fold and unfold, and have strong adaptability;

2. According to the present invention, the corner base assembly further includes a reinforcing member, so that the corner base assembly can be stably connected to the ground, and the reinforcing member provides two solutions, which can be respectively applied to smooth indoor ground and soft outdoor ground;
3. According to the present invention, a door lock structure is also provided, which is compact in structure and convenient in operation;
4. According to the present invention, a solution for achieving a rotary connection between the two adjacent fence panels is also provided, which includes providing a sleeve member to make the connection of the rotary shaft rod more stable while reducing the friction force, improving structural strength and prolonging the service life of the product.

DETAILED DESCRIPTION OF THE INVENTION

The present invention is further described below with reference to the accompanying drawings:

The orientations described in the description of the present invention, such as "upper", "lower", "left", "right", "front", "rear", etc. are based on the orientation of the drawings, are for the purpose of describing the relationship between the various components, do not indicate the only or absolute positional relationship between the various components, and are only one embodiment for achieving the present invention, and do not limit the embodiment thereof.

Figure 1:
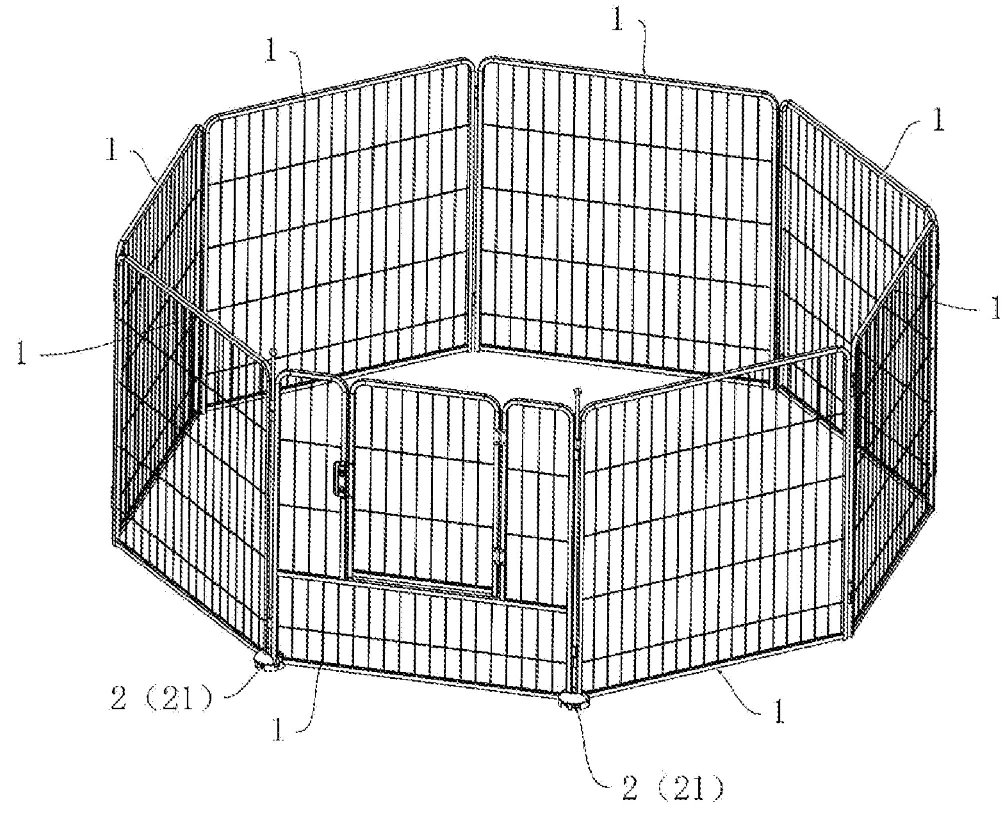
FIG. 1 is a schematic perspective diagram of a fence kit according to a first embodiment of the present invention.
Figure 2:
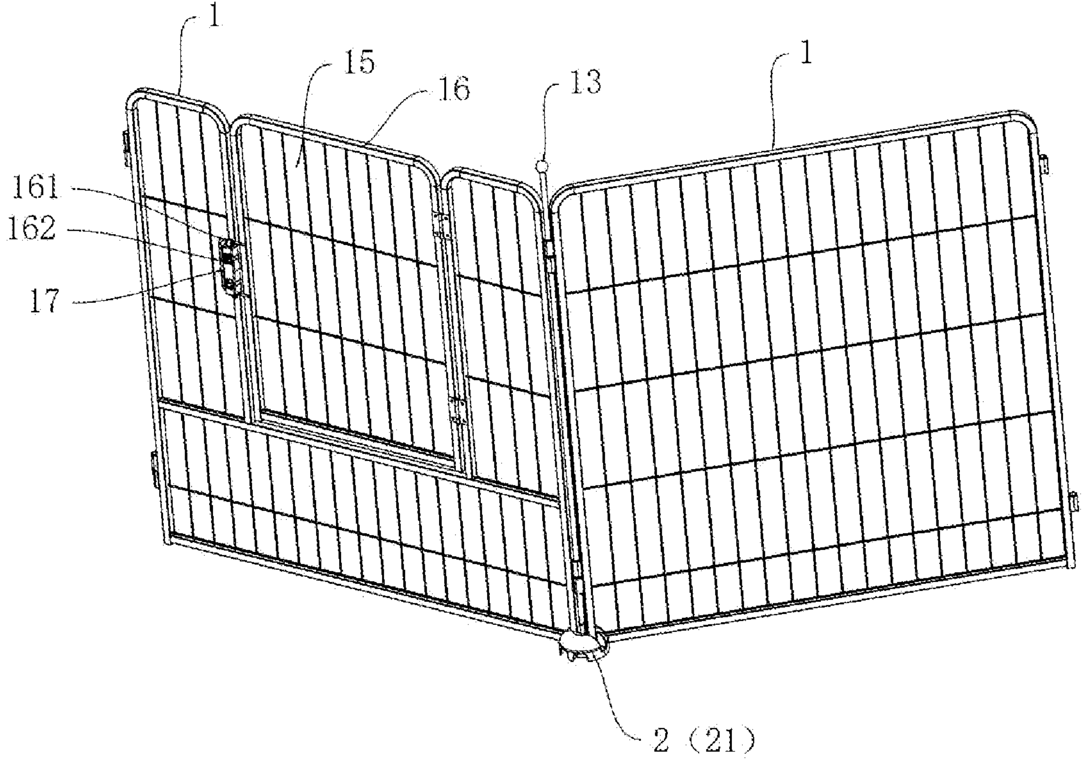
FIG. 2 is a second schematic perspective diagram of a fence kit according to a first embodiment of the present invention.
Figure 6:
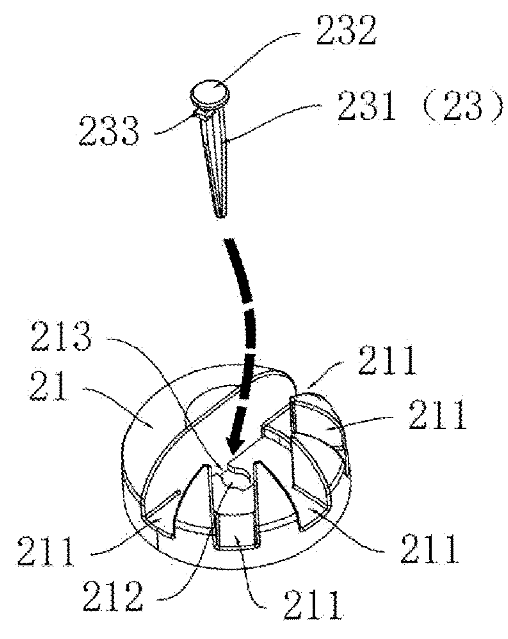
FIG. 6 is a schematic structural diagram of another solution of a reinforcing member according to a first embodiment of the present invention.
Figure 9:
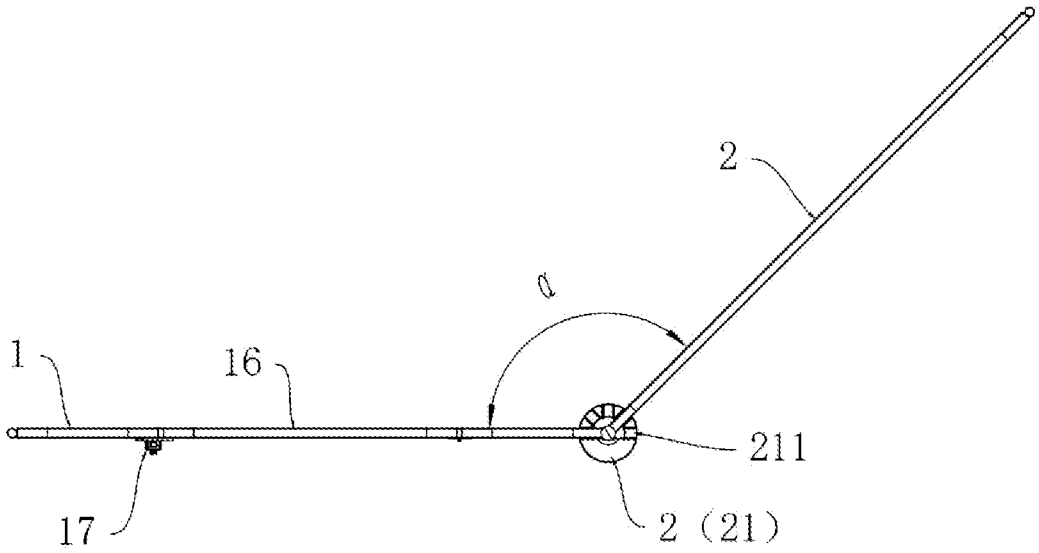
FIG. 9 is a schematic top diagram of a fence kit according to a first embodiment of the present invention.
Figure 10:
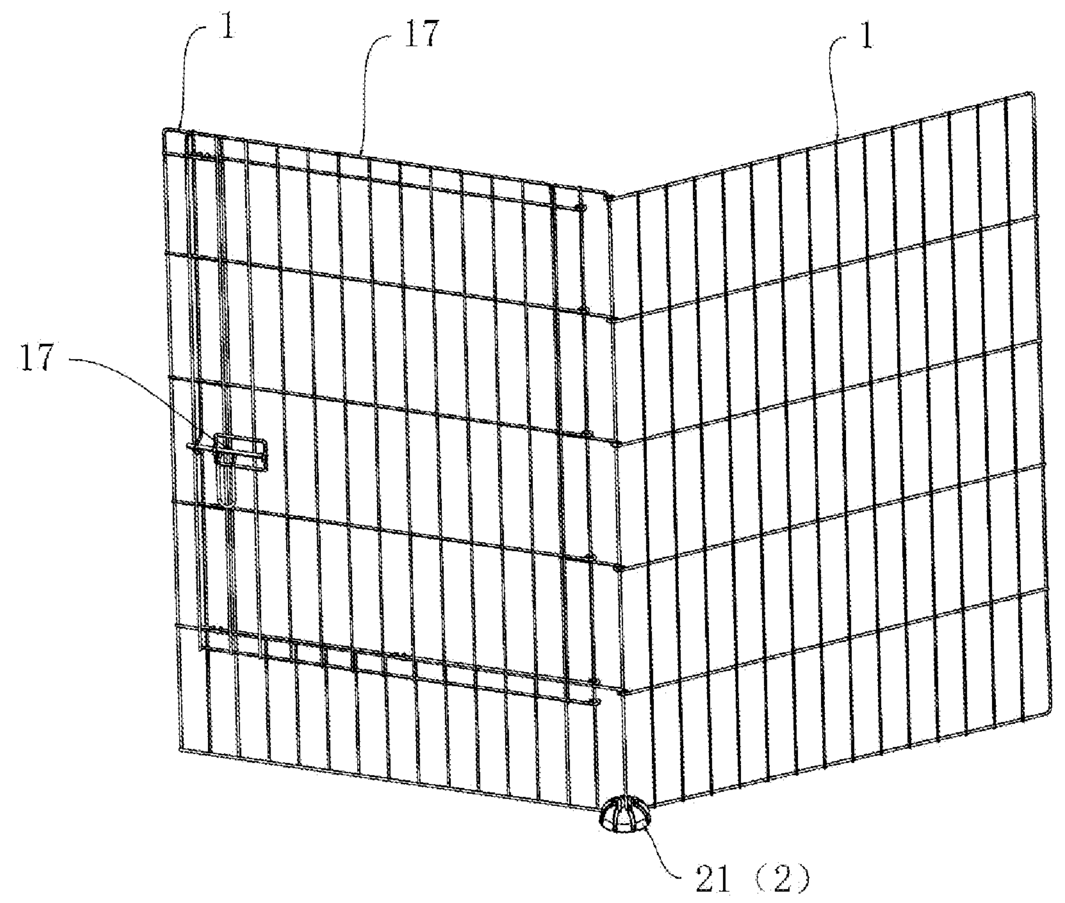
FIG. 10 is a schematic perspective diagram of a fence kit according to a second embodiment of the present invention.

According to the first embodiment: as shown in FIG. 1, a fence kit includes at least two fence panels 1, two adjacent fence panels 1 are rotatably connected, and a plurality of fence panels 1 are successively connected end-to-end so as to enclose a circle for the pet to move. If only two fence panels 1 are connected, the fence panels 1 may be made into a curved shape so that the two fence panels 1 can be connected end-to-end to enclose a circle, or the two fence panels 1 are connected and arranged at one side of a wall so that the fence panels 1 and the wall together enclose a circle, and the structure may be flexibly changed and adjusted. As shown in FIG. 2, in the present embodiment, the fence kit further includes a corner base assembly 2, and the corner base assembly 2 is arranged between the two adjacent fence panels 1, wherein the corner base assembly 2 includes a corner support 21, an upper surface of the corner support 21 is provided with at least two mounting grooves 211, and as shown in FIG. 6 and FIG. 9, different mounting grooves 211 are all connected at one end and open at the other end, an included angle $\alpha$ of 1° to 180° is provided between the different mounting grooves 211, the mounting grooves 211 match the shape of the bottom of the fence panels 1, and after the two adjacent fence panels 1 are respectively inserted into any two mounting grooves 211, an included angle $\alpha$ of 1° to 180° is provided between the two fence panels 1. When there are three or more fence panels 1, fence circles of triangular, quadrilateral and pentagonal shapes may be enclosed, and the mounting grooves 211 of the corner base assembly 2 can fix and lock the two adjacent fence panels 1, so that the adjacent fence panels 1 stably form an included angle, which are not easy to loosen and have better structural stability.

Figure 5:
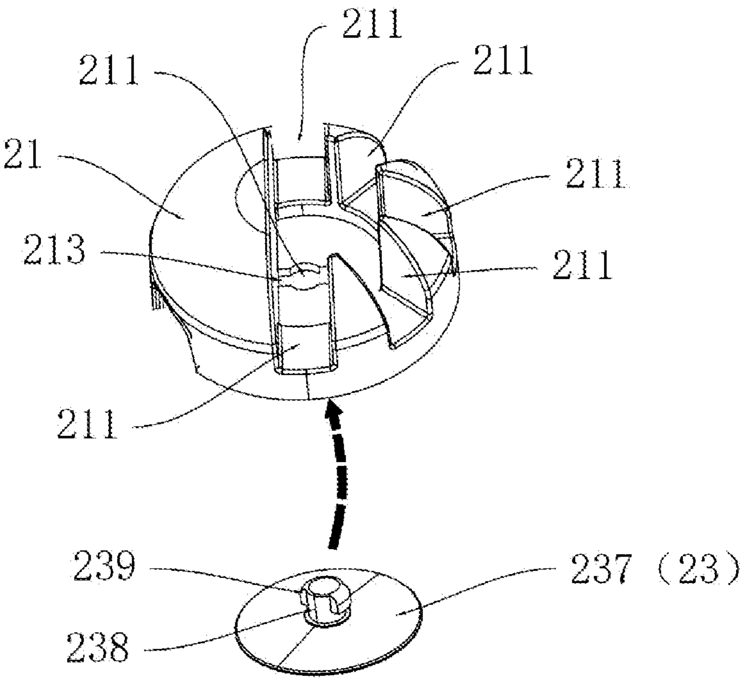
FIG. 5 is a schematic structural diagram of one solution of a reinforcing member according to a first embodiment of the present invention.
Figure 7:
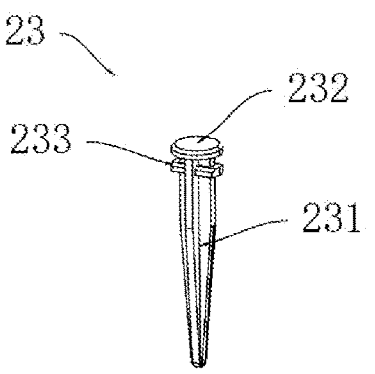
FIG. 7 is a schematic structural diagram of one solution of an insertion rod according to a first embodiment of the present invention.

As a preferred solution, as shown in FIGS. 5 to 7, the corner base assembly 2 further includes a reinforcing member 23 connected to the corner support 21 and configured to fix the corner support 21 to the ground so that the corner support 21 can be more firmly connected to the ground.

With regard to the structure of the reinforcing member 23, two solutions are provided in the present embodiment:

One of which is that, as shown in FIG. 6 and FIG. 7, a middle portion of the corner support 21 is provided with an insertion hole 212, and the reinforcing member 23 includes an insertion rod 231 capable of passing through the insertion hole 212 from top to bottom and protruding downward from the bottom of the corner support 21, wherein the insertion rod 231 is of a sharp shape with a large upper portion and a small lower portion, and the top of the insertion rod 231 is provided with a snap joint 232 capable of being snapped at a hole opening of the insertion hole 212. This structure can be inserted into a relatively soft ground via the insertion rod 231 so as to fixedly connect the corner support 21 to the ground, and this solution is suitable for an outdoor environment with ground, but is not suitable for indoors. In this solution, a further improvement solution is provided. As shown in FIG. 7, the insertion hole 212 is a circular hole, an edge of the insertion hole 212 is provided with a notch 213, and the insertion rod 231 is provided at a side adjacent to the snap joint 232 with a first clamping protrusion 233 capable of passing through the notch 213 when the insertion rod 231 passes through the insertion hole 212. In this way, after the first clamping protrusion 233 passes through the notch 213, the first clamping protrusion 233 may be clamped on the edge of the insertion hole 212 by rotating the insertion rod 231 or rotating the corner support 21, thereby fixedly connecting the insertion rod 231 and the corner support 21 together, and fixedly connecting the corner support 21 to the ground.

Another solution of which is that, as shown in FIG. 5, the middle portion of the corner support 21 is provided with an insertion hole 212, an edge of the insertion hole 212 is provided with a notch 213, the reinforcing member 23 includes a suction cup 237, a top of the suction cup 237 is provided with a plug post 238 capable of passing through the insertion hole 212 from bottom to top, and a top of the plug post 238 is provided with a second clamping protrusion 239 capable of passing through the notch 213 when the plug post 238 passes through the insertion hole 212. In this way, after the plug post 238 passes through the insertion hole 212, the second clamping protrusion 239 is clamped on the edge of the insertion hole 212 by rotating the suction cup 237 or the corner support 21, thereby connecting the suction cup 237 and the corner support 21 together, and fixedly connecting the corner support 21 to the ground. This solution is more suitable for indoor ground having a smooth surface than the above-mentioned first solution.

With regard to the structure of the insertion rod 231, two solutions are provided in the present embodiment:

One of which is that, as shown in FIG. 7, the snap joint 232 is in the shape of a disc with a size larger than that of the insertion hole 212, and the first clamping protrusion 233 is symmetrically provided with two. The insertion rod 231, the snap joint 232 and the first clamping protrusion 233 are an injection molded one-piece unitary structure, which has a simple structure and a low production cost in mass production, but has the disadvantages of a high cost of making the mold at the early stage and a lower structural strength than a metal piece.

Figure 8:
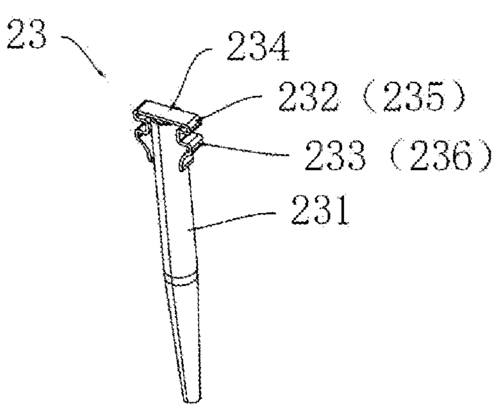
FIG. 8 is a schematic structural diagram of another solution of an insertion rod according to a first embodiment of the present invention.

Another solution of which is that, as shown in FIG. 8, the insertion rod 231 is a metal piece, a bending piece 234 of a metal material is connected to the top of the insertion rod 231 by welding, the bending piece 234 has a first bending portion 235 and a second bending portion 236 protruding outwards, wherein two symmetrical first bending portions 235 and two second bending portions 236 are formed after the bending piece 234 extends to two sides of the insertion rod 231, and certainly the function thereof may be achieved as long as there is one first bending portion 235 and one second bending portion 236. The first bending portion 235 constitutes the snap joint 232, and the second bending portion 236 constitutes the first clamping protrusion 233. This solution consists of connecting the bending piece 234 of the insertion rod 231 by welding, which has high structural strength, convenient processing and lower cost at the early stage.

Figure 3:
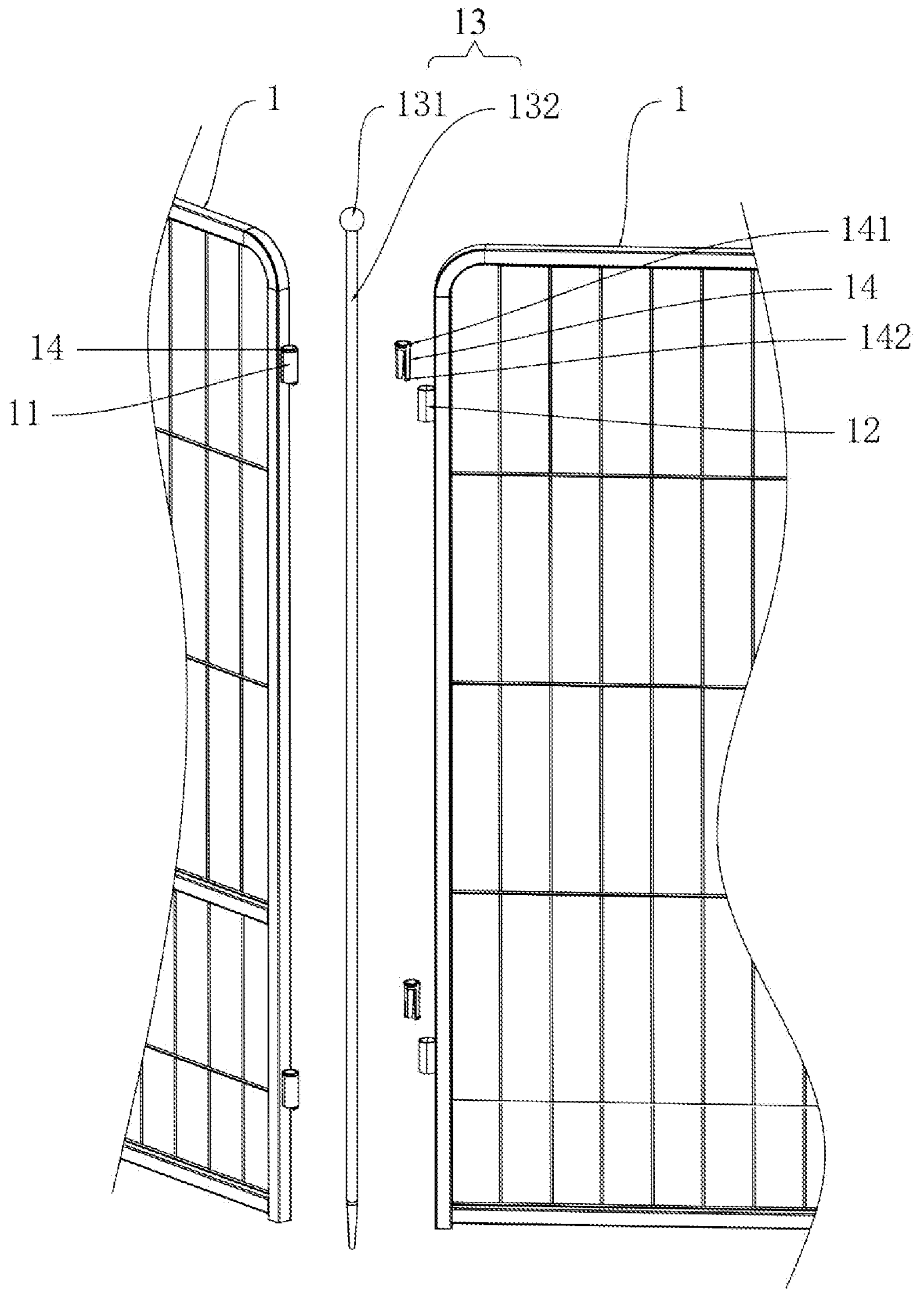
FIG. 3 is an exploded schematic diagram of a fence kit according to a first embodiment of the present invention.

With regard to how to achieve a rotary connection between the two adjacent fence panels 1, as shown in FIG. 3, the fence panels 1 are provided with an upper mounting pipe 11 on one side and a lower mounting pipe 12 on the other side, the upper mounting pipe 11 of one fence panel 1 is centrally aligned with the lower mounting pipe 12 of the adjacent other fence panel 1, and a rotary shaft rod 13 capable of passing through the upper mounting pipe 11 and the lower mounting pipe 12 is provided between the two adjacent fence panels 1 so as to enable a rotary connection between the two adjacent fence panels 1, and it is also possible to achieve mutual rotation between the two by means of connecting pieces such as hinges.

As a preferred solution, as shown in FIG. 3, the upper mounting pipe 11 and the lower mounting pipe 12 are both internally provided with a sleeve member 14, a top of the sleeve member 14 is provided with a positioning ring 141 capable of being clamped at an upper end of the upper mounting pipe 11 or the lower mounting pipe 12, a bottom of the sleeve member 14 is provided with a snap capable of being clamped at a lower end of the upper mounting pipe 11 or the lower mounting pipe 12, and the rotary shaft rod 13 is inserted inside the sleeve member 14, so that the rotary shaft rod 13 does not need to directly contact the upper mounting pipe 11 or the lower mounting pipe 12, thereby reducing friction and prolonging the service life of the structure. Further, the rotary shaft rod 13 includes a rod body 131 made of a metal pipe, and a holding portion 132 arranged at a top of the rod body 131, wherein the holding portion 132 is an injection molded sphere, and the bottom of the sphere is provided with a hole capable of being sheathed on the rotary shaft rod 13.

Figure 4:
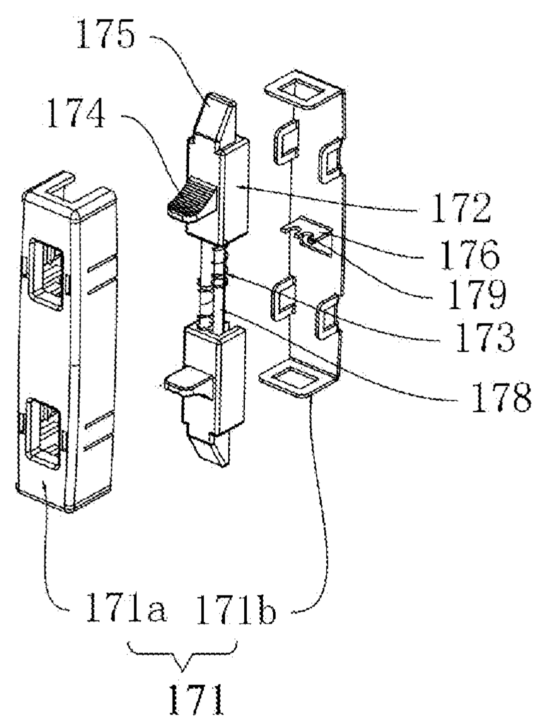
FIG. 4 is an exploded schematic diagram of a door lock according to a first embodiment of the present invention.

As a preferred solution, as shown in FIG. 2 and FIG. 4, at least one fence panel 1 is provided with a door 15 and a door panel 16 capable of rotating relative thereto to close the door 15. In the present embodiment, the door panel 16 and the fence panel 1 are connected via a hinge so as to achieve a rotary connection, and the door panel 16 is provided with two transverse locking rods 161. In the present embodiment, the door panel 16 is provided with a C-shaped handle rod 162, and the locking rod 161 is a part of the structure on the handle rod 162. The fence panel 1 is provided with a door lock 17, and the door lock 17 includes a housing 171. The housing 171 is provided with a bottom plate **171*a* and an upper cover 171*b*, which are connected in a covering manner. The housing 171 is provided with two locking blocks 172 capable of sliding relative thereto. An elastic member 173 being provided between the locking blocks 172 and the housing 171 capable of pushing the two locking blocks 172 to move away from each other. The bottom plate 171*a* is provided with a guide plate 176, and one end of the elastic member 173 abuts against the guide plate 176 and the other end abuts against the locking blocks 172. The locking blocks 172 are provided with handles 174 protruding outwards for human operation, and the locking blocks 172 are further provided with stop blocks 175 capable of stopping the movement of the locking rod 161 when the two locking blocks move away from each other. In this way, the locking rod 161 can be stopped and the door panel 16 can be locked, and the door panel can be unlocked by manually pushing the locking blocks 172 closer to each other, so that the stop blocks 175 are away from the locking rod 161. Preferably, the locking block 172 is further provided with a guide rod 178, and the guide plate 176 is provided with a sliding groove 179 for sliding the guide rod 178**.

Figure 11:
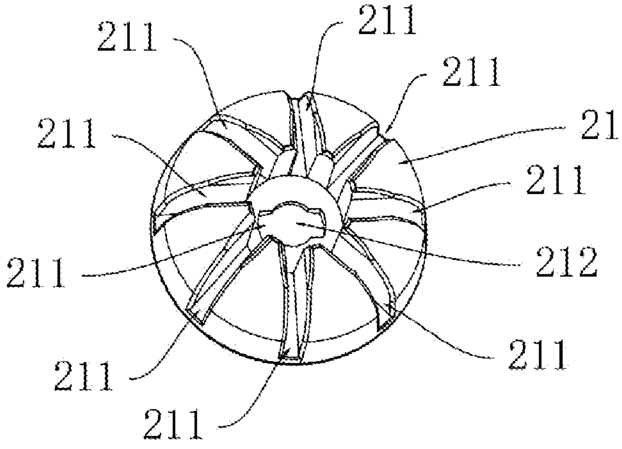
FIG. 11 is a schematic perspective diagram of a corner support according to a second embodiment of the present invention.

According to the second embodiment:

as shown in FIG. 1, a fence kit is provided, which is different from the first embodiment in that: the fence panel 1 in the first embodiment is made of a metal square pipe as a frame, while the fence panel 1 in the present embodiment is made of metal net panels connected by a plurality of metal strips arranged horizontally and vertically, so that the corner support 21 in the present embodiment is shown in FIG. 11, and the width of the mounting grooves 211 of the corner support 21 is narrower, and the number of the mounting grooves 211 arranged on the corner support 21 is greater. The adjacent fence panels 1 in the present embodiment are pivotally connected via hinges.

What has been described above is merely an embodiment of the present invention, and common knowledge, such as a known specific structure and characteristics in the solution, is not further described herein. It should be noted that for a person skilled in the art, several changes and modifications can be made without departing from the structure of the present invention, and these should also be considered as the scope of protection of the present invention, and these will not affect the effect of the implementation of the present invention and the applicability of the patent. The scope of protection sought in the present application should be determined with reference to the contents of the claims, and reference to particular embodiments contained in the description may be used for interpreting the contents of the claims.

The invention claimed is:

1. A fence kit, comprising:
at least two fence panels; and
a corner base assembly, wherein:
two adjacent fence panels among the at least two fence panels are rotatably connected to each other,
the corner base assembly is arranged between the two adjacent fence panels,
the corner base assembly includes a corner support, an upper surface of the corner support being provided with at least two mounting grooves,
the mounting grooves are connected to each other at one end and are open at the other end,
the mounting grooves match a shape of a bottom of the fence panels,
the two adjacent fence panels are respectively inserted into any two mounting grooves among the at least two mounting grooves,
at least one fence panel among the at least two fence panels is provided with a door and a door panel capable of rotating relative to the door to close the door,
the door panel is provided with two transverse locking rods,
each at least one fence panel is provided with a door lock,
the door lock includes a housing, the housing being provided with two locking blocks capable of sliding relative to the housing,
an elastic member capable of pushing the two locking blocks in a direction away from each other is provided between the locking blocks and the housing,
the locking blocks are provided with handles protruding outwards for human operation, and
the locking blocks are further provided with stop blocks capable of stopping the movement of the locking rods when the two locking blocks move away from each other.

2. The fence kit according to claim 1, wherein the corner base assembly further includes a reinforcing member connected to the corner support and configured to fix the corner support to the ground.

3. The fence kit according to claim 2, wherein:
a middle portion of the corner support is provided with an insertion hole, and the reinforcing member includes an insertion rod capable of passing through the insertion hole from top to bottom and protruding downward from a bottom of the corner support,
the insertion rod is of a sharp shape with a large upper portion and a small lower portion, and
a top of the insertion rod is provided with a snap joint capable of being snapped at a hole opening of the insertion hole.

4. The fence kit according to claim 3, wherein:
the insertion hole is a circular hole,
an edge of the insertion hole is provided with a notch, and
the insertion rod is provided at a side adjacent to the snap joint with a first clamping protrusion capable of passing through the notch when the insertion rod passes through the insertion hole.

5. The fence kit according to claim 4, wherein the insertion rod, the snap joint and the first clamping protrusion are an injection molded one-piece unitary structure.

6. The fence kit according to claim 4, wherein:
the insertion rod is a metal piece,
a bending piece of a metal material is connected to a top of the insertion rod by welding,
the bending piece has a first bending portion and a second bending portion protruding outwards,
the first bending portion constitutes the snap joint, and
the second bending portion constitutes the first clamping protrusion.

7. The fence kit according to claim 2, wherein:
a middle portion of the corner support is provided with an insertion hole,
an edge of the insertion hole is provided with a notch,
the reinforcing member includes a suction cup,
a top of the suction cup is provided with a plug post capable of passing through the insertion hole from bottom to top, and
a top of the plug post is provided with a second clamping protrusion capable of passing through the notch when the plug post passes through the insertion hole.

8. The fence kit according to claim 1, wherein:
each fence panel is provided with an upper mounting pipe on one side and a lower mounting pipe on the other side,
the upper mounting pipe of each fence panel is centrally aligned with the lower mounting pipe of the adjacent other fence panel, and
a shaft rod capable of passing through the upper mounting pipes and the lower mounting pipes is provided between the two adjacent fence panels so as to enable a rotary connection between the two adjacent fence panels.

9. The fence kit according to claim 8, wherein:
the upper mounting pipe and the lower mounting pipe are both internally provided with a sleeve member,
a top of the sleeve member is provided with a positioning ring capable of being clamped at an upper end of the upper mounting pipe or the lower mounting pipe,
a bottom of the sleeve member is provided with a snap capable of being clamped at a lower end of the upper mounting pipe or the lower mounting pipe, and
the shaft rod is inserted inside the sleeve member.

10. A fence kit, comprising:
at least two fence panels; and
a corner base assembly, wherein:
two adjacent fence panels among the at least two fence panels are rotatably connected to each other,
the corner base assembly is arranged between the two adjacent fence panels,
the corner base assembly includes a corner support, an upper surface of the corner support being provided with at least two mounting grooves,
the mounting grooves are connected to each other at one end and are open at the other end,
the mounting grooves match a shape of a bottom of the fence panels,
the two adjacent fence panels are respectively inserted into any two mounting grooves among the at least two mounting grooves,
the corner base assembly further includes a reinforcing member connected to the corner support and configured to fix the corner support to the ground,
a middle portion of the corner support is provided with an insertion hole,
an edge of the insertion hole is provided with a notch,
the reinforcing member includes a suction cup, a top of the suction cup is provided with a plug post capable of passing through the insertion hole from bottom to top, and a top of the plug post is provided with a second clamping protrusion capable of passing through the notch when the plug post passes through the insertion hole.

* * * * *